3,368,983
CYCLOPENTYL EPOXIDES AND RESINOUS
COMPOSITIONS
Samuel W. Tinsley, South Charleston, and Paul S.
Starcher, Charleston, W. Va., and Paul A. King,
Warwick, N.Y., assignors to Union Carbide Corporation, a corporation of New York
No Drawing. Continuation-in-part of application Ser. No. 54,579, Sept. 8, 1960. This application Apr. 19, 1963, Ser. No. 274,298
11 Claims. (Cl. 260—2)

This application is a continuation-in-part of our copending application Ser. No. 54,579, filed Sept. 9, 1960, and now abandoned.

This invention relates to novel oxirane compositions, their preparation, and their treatment to produce a cured product. More particularly, this invention is directed to compositions and compounds possessing vicinal epoxy groups substituted on cyclopentyl radicals. Furthermore, this invention relates to compounds possessing functional groups, in addition to epoxiy, capable of reaction with other chemicals resulting in the manufacture of useful resinous materials.

The epoxy products of this invention are significantly suitable for use as surface coating materials, films, and adhesives.

The oxirane compounds encompassed by this invention contain a plurality of joined cyclopentyl and/or cyclopentenyl radicals, at least one of which is cyclopentyl possessing an oxirane group as a part thereof. Most significant of these novel oxirane compounds is that at least two of the joined radicals are directly interbonded at one carbon atom of each of the radicals. The compounds may possess a plurality of functional and non-functional substituents which alter the properties of the compound and/or enable it to enter into reactions other than through the oxirane group.

Epoxides encompassed by this invention are illustrated by those exemplified by the formula:

A—B wherein A is a radical which may be either

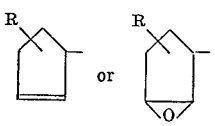

B is a radical which may be either

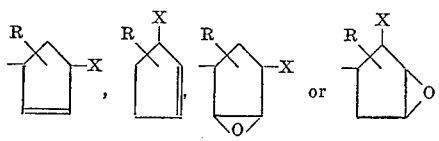

wherein each R represents hydrogen or an alkyl group having from 1 to 12 carbon atoms and X represents a group such as

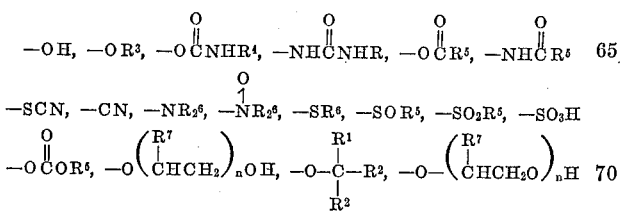

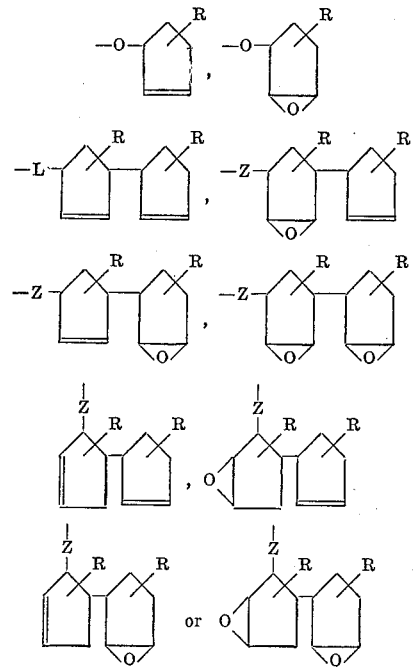

wherein Z is oxygen, sulfur, sulfoxide or sulfone; $R^1$ represents alkenyl of from 2 to 12 carbon atoms, or vicinal-epoxyalkyl of from 2 to 12 carbon atoms; $R^2$ is hydrogen, alkyl of from 1 to 12 carbon atoms, alkenyl having from 2 to 12 carbon atoms, or vicinal-epoxyalkyl of from 2 to 12 carbon atoms; $R^3$ represents aryl or alkaryl; $R^4$ is an alkyl group of from 1 to 12 carbon atoms; $R^5$ is alkyl of from 1 to 12 carbon atoms; alkenyl having from 2 to 12 carbon atoms, vicinal-epoxyalkyl of from 2 to 12 carbon atoms, aryl and alkaryl; $R^6$ represents $R^5$ or hydrogen; $R^7$ is hydrogen or methyl; and n is an integer of from 1 to 6. The above compounds contain at least 1, preferably at least 2, vicinal epoxy groups.

These novel epoxides are derived from the cyclopentenylcyclopentenyl compounds disclosed in co-pending United States Patent application Ser. No. 54,579, filed Sept. 8, 1960, in the name of the applicants herein. This co-pending application discloses a novel class of polyunsaturated compounds possessing joined cyclopentenyl radicals and having the following formulas:

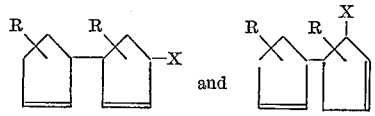

wherein R and X are substantially as defined above.

The cyclopentenylcyclopentenyl compounds may be treated with an oxirane forming agent capable of producing vicinal epoxy groups at the site of the olefinic unsaturation within the compound. Organic peracids are a particularly desirable class of vicinal epoxide forming agents.

Usable organic peracids suitable for epoxidation of the aforementioned polyunsaturated compounds include aliphatic peracids, cycloaliphatic peracids, aromatic peracids, and the like. Desirably, the acyl moiety of the peracid exclusive of carbonyl is hydrocarbon. Illustrative of suitable peracids include peracetic acid, perpropionic acid, perbutyric acid, perhexanoic acid, perdodecanoic acid, perbenzoic acid, monoperphthalic acid, and the like. The lower aliphatic peracids containing from 2 to 4 carbon atoms are significantly suitable, and of this class, peracetic acid is the most preferred.

The peracid may be employed as a solution, typically in an inert organic liquid medium such as ethyl acetate, butyl acetate, acetone, and the like. The solution may contain peracid in amounts of from about 10 to about 50 percent, basis weight of solution, preferably from about 20 to about 40 percent by weight of peracid.

The epoxidation of the polyolefinic unsaturated compounds described above can be conducted at about 0° C. to about 100° C., although higher and lower temperatures are included as operational. In most cases, temperatures ranging about 25° C. to about 75° C. are preferred.

In a typical operation of this process, the peracid is utilized in an amount sufficient to convert at least one olefinic group in the compound to epoxy. An excess quantity of said peracid insures substantial epoxidation of the polyolefin precursor. For instance, from about 1.1 to about 5, or higher, moles of peracid per olefinic double bonded carbon atoms (C=C) can be employed with advantageous results, though, of course, lower and higher ratios of peracid per each olefinic radical is within the purview of this invention. It should be understood that the polyolefinic unsaturated compounds undergoing epoxidation may contain other radicals capable of reaction with the peracid, such as sulfide to sulfoxide or sulfone, tertiary amine to the amine oxide, and the like. Thus the amount of peracid should be sufficient to insure epoxidation when these radicals compete with the olefinic groups for oxygen.

Usuable cyclopentenylcyclopentenyl compounds for the manufacture of the epoxides of this invention include the following:

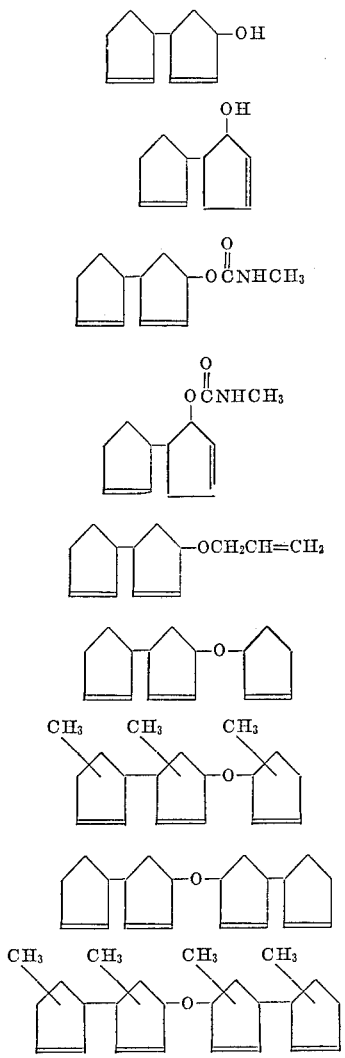

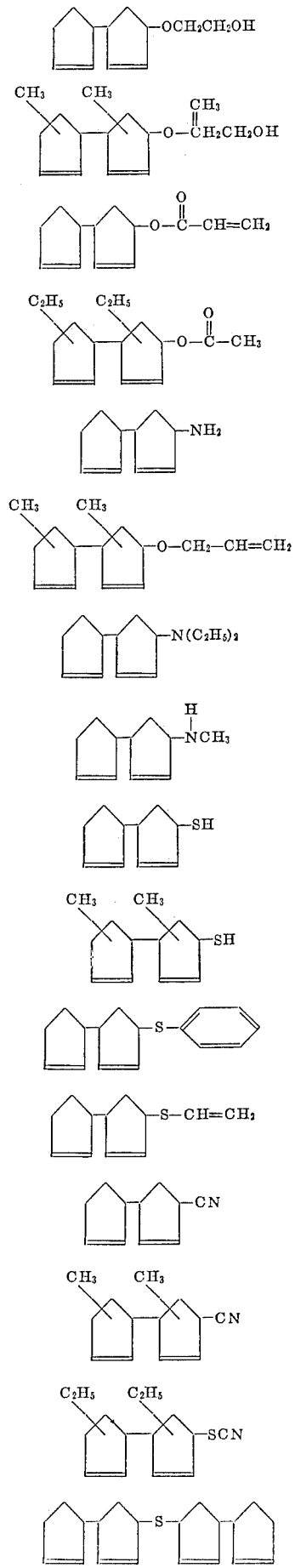

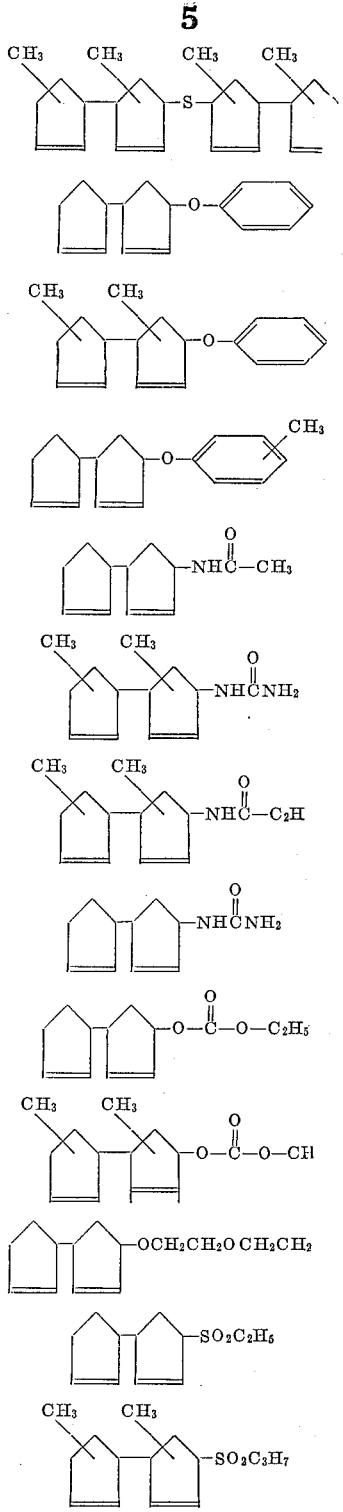

When any of the above cyclopentenylcyclopentenyl compounds are epoxidized the resulting compound must have at least one, preferably at least two, vicinal epoxy groups bonded to cyclopentyl radical. For example, in the above formula where X is a group other than one containing cyclopentenyl, one or both of the cyclopentenyl radicals are epoxidized. In this case the compounds formed would have one of the following formulae:

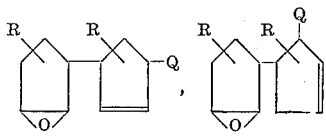

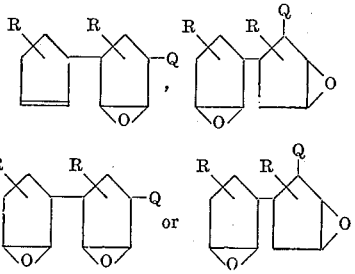

wherein R is as defined above, Q is of the group such as:

$-OH$, $-OR^3$, $-O\overset{O}{\underset{}{C}}NHR^4$, $-NH\overset{O}{\underset{}{C}}NHR$, $-O\overset{O}{\underset{}{C}}R^5$, $-NH\overset{O}{\underset{}{C}}R^5$ $-SCN$, $-CN$, $-NR_2{}^6$, $-\overset{O}{\underset{\uparrow}{N}}R_2{}^6$, $-SR^6$, $-SOR^5$, $-SO_2R^5$, $-SO_3H$ $-O\overset{O}{\underset{}{C}}OR^6$, $-O\left(\overset{R^7}{\underset{}{C}}HCH_2\right)_nOH$, $-O-\overset{R^1}{\underset{R^2}{C}}-R^2$, $-O-\left(\overset{R^7}{\underset{}{C}}HCH_2O\right)_nH$ wherein $R^1$, $R^2$, $R^3$, $R^4$, $R^5$, $R^6$, and $R^7$ are as defined above.

However, when X of the above formula is a group such as

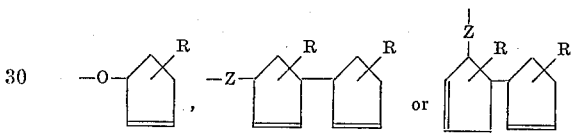

wherein Z is oxygen, sulfur, sulfoxide, or sulfone, and R is as defined above, the cyclopentenylcyclopentenyl moiety thereof exclusive of X may be partially epoxidized or not epoxidized at all and in which latter case the cyclopentenyl moieties defined by X should be epoxidized wherein to produce compounds which contain at least two epoxy groups. Such compounds are illustrated by the following formula:

wherein L is a radical such as

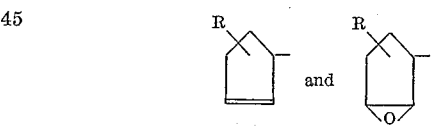

M is a radical such as

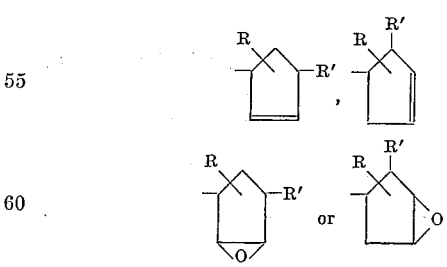

wherein R' may be one of the following:

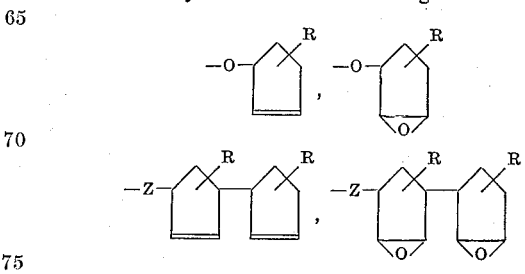

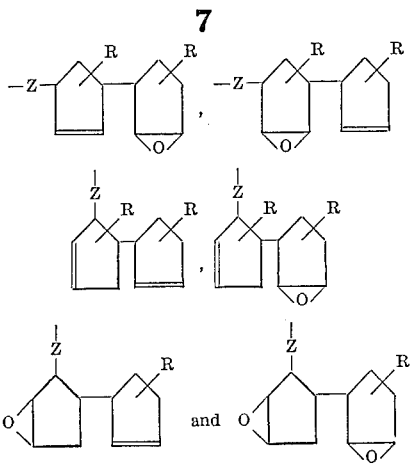

provided that R' contains a

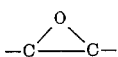

group when L and M (exclusive of R') are free of such a group, and preferably, R' contains a

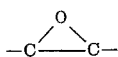

group when either L or M are free of such a group. R and Z are as defined above.

As noted above, the epoxy compounds of this invention may possess olefinic unsaturation. The olefinic unsaturation represents functionality which may be utilized for production of an addition polymer containing a plurality of skeletal chain bonded vicinal epoxy groups or pendant vicinal epoxy groups. These epoxy groups are available for cross-linking or chain extension as hereinafter described.

The epoxy compounds possessing the olefinic unsaturation may be reacted with themselves to produce homopolymers, or with other olefinic unsaturated compounds to form co-, ter- or other multi-component polymers, having available

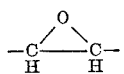

for further reaction.

For example,

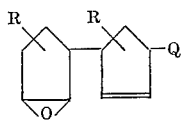

can be homopolymerized or co-polymerized with, e.g.,

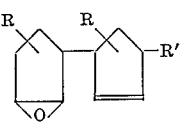

Other olefinically unsaturated compounds which may be employed for polymerization with the cyclopentenyl containing epoxy compounds of this invention include ethylenically unsaturated compounds such as: mono- and poly-ethylenically unsaturated hydrocarbons such as ethylene, propylene, butadiene, styrene, alpha-methylstyrene and divinyl benzene; ethylenically unsaturated aldehydes and acetals, e.g., acrolein and diallylidene pentaerythritol; ethylenically unsaturated monocarboxylic acids and esters such as acrylic acid, methacrylic acid, methyl acrylate, ethyl acrylate, butyl acrylate, octyl acrylate, ethyl methacrylate, butyl methacrylate, oleic acid and 2-ethyl hexyl methacrylate; ethylenically unsaturated nitriles such as acrylonitrile and methacrylonitrile; ethylenically unsaturated polycarboxylic acids, anhydrides and esters such as maleic acid, anhydride and alkyl (1–18 carbon atoms) esters, and fumaric acid, anhydride and alkyl (1–18 carbon atoms) esters; polyethylenically unsaturated monocarboxylic acids, such as sorbic acid, linoleic acid and linolenic acid; unsaturated esters, such as divinyl ether and diallyl ether; halide esters of olefins such as allyl chloride, vinylidene chloride and vinyl chloride; ethylenically unsaturated esters of carboxylic acids such as vinyl acetate and diallylcarbonate; alkenyl substituted silanes and siloxanes, such as vinyl silane, vinyl trichloro silane, vinyl trimethyl silane, divinyl dimethyl silane, allyl trimethyl silane, allyl silane, polyvinyl siloxane $$(CH_2=CHSiO_{3/2})$$

polyvinylmethylsiloxane

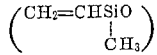

and polyvinyl phenylsiloxane

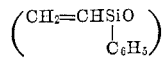

and olefinically unsaturated esters of inorganic acids such as tetraallyl silicate and triallylphosphate; and the like.

Polymerization of the olefinically unsaturated epoxy compounds indicated above may be effected by conventional free-radical initiation, such as peroxide catalysis, typically by solution or mass polymerization techniques. Usable peroxide catalysts include benzoyl peroxide, hydrogen peroxide, dicumyl peroxide, and di-tertiary butyl peroxide. Polymerization may be effected in an inert solvent for the unsaturated epoxy monomer, or in the monomer per se at a temperature at which the monomer is liquid. Usable inert solvents for this polymerization reaction include the various hydrocarbon solvents such as hexane, heptane, octane, decane, toluene, benzene, xylene and the like; ether solvents such as diethylether, dibutylether, diisopropylether, dioxane and the like; ketones such as methyl ethyl ketone and methyl isopropyl ketone; esters such as ethyl acetate, propyl acetate, isopropyl acetate, butyl acetate, amyl acetate; or alcohols such as methanol, ethanol, propanol, isopropanol, butanol, isobutanol and the like. Compatible mixtures of the above solvents may be employed. The solvents to be utilized in the aforementioned addition polymerization reaction should be free of groups which could interfere with reaction, such as olefinic unsaturation.

Polymerization may be sufficient to produce dimers and trimers, etc., of the above monomers, to resinous polymers up to 100,000 monomer units in size. The addition reaction is typically operated at a temperature above that at which the peroxide catalyst releases free radicals for polymerization. In general, the reaction is carried out at a temperature of from 10 to 200° C., preferably at a temperature between 50 and 150° C. Greater or lesser temperatures may be employed depending upon the invironmental conditions of reaction and the selection of catalyst; of course, selection of each is well within the skill of the artisan.

The epoxy compounds of this invention which include the addition polymers described above, may be polymerized by reaction therewith of an acidic or basic catalyst capable of opening a vicinal epoxy radical at the site of a carbon to oxygen bond or an organic reagent possessing a functional group capable of adding to the epoxy compound at the site created by splitting an oxygen to carbon bond of an oxirane radical. Evidence of this bond splitting may be determined by the presence of, e.g., hydroxyl, carbamate, ether and/or ester groups at the sites formerly containing the oxirane oxygen.

The polymerization products of the aforementioned epoxy compounds, effected through what is termed a "condensation type" reaction involving the splitting open of the oxirane radical, may be achieved within a broad temperature range, for example from about 20° C. or lower, to about 300° C. or higher, typically for a period of time sufficient to produce the polymeric product having a molecular weight suitable for the desired use. Thus, the epoxy compounds of this invention may be polymerized to liquid or solid resinous compositions, depending on the degree of polymerization effected, and this is typically dependant upon the amount of acid or basic catalyst or organic reagent employed at the temperature and residence time of reaction. The selection of the desired conditions will become obvious to a skilled worker from the discussion herein and well established knowledge in the art.

The acidic and basic catalysts which can be employed in the "condensation type" reaction include Lewis acids of the non-metal and metal halide class, such as boron trifluoride, aluminum chloride, zinc chloride, stannic chloride, ferric chloride, boron trifluoride-piperidine complex, boron trifluoride-1,6-hexamethylene diamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., hydrochloric acid, sulfuric acid, phosphoric acid, polyphosphoric acid, perchloric acid, and the like; the saturated straight, branched chain or cycloaliphatic hydrocarbon sulfonic acids and the aromatic hydrocarbon sulfonic acids, e.g., ethanesulfonic acid, propanesulfonic acid, cyclohexane sulfonic acid, benzenesulfonic acid, toluenesulfonic acid, naphthalenesulfonic acid, lower alkyl (1 to 18 carbon atoms) substituted-benzenesulfonic acid, and the like; the alkali metal hydroxides, e.g., sodium hydroxide, potassium hydroxide and the like; the alkali metal carbonates such as sodium, potassium and lithium carbonate, bicarbonate and/or sesquicarbonate, and the like; the tertiary amines and quaternary ammonium compounds e.g., alpha-methylbenzyldimethylamine, dimethylethylamine, triethylamine, tripropylamine, tetramethylammonium hydroxide, benzyltrimethylammonium hydroxide, and the like.

Catalyst concentration and temperature of reaction, as indicated above, typically affect the degree of polymerization and, as well, affect the rate of polymerization. For example, higher catalyst concentration and temperature usually promote faster reaction rates. The catalyst concentration, of course, is variable over a broad range depending upon the temperature of reaction employed and the degree and rate of polymerization desired. In general, a catalyst concentration may be employed of from about 0.005 to 15 percent, preferably from about 0.01 to 5 percent, basis weight of compound A-B per se as above described or as a polymer unit.

As indicated above, polymerization through the "condensation" route can be effected utilizing a catalyst system or through reaction with an organic reagent. With respect to these organic reagents, typically contrary to the functioning of the catalyst system, the organic reagent becomes integrally bound in the resulting polymer, and for this reason, can be termed a copolymeric reactant. Of course, the variety of reactants will determine whether the polymer is termed a copolymer, a terpolymer, etc. The organic reagent possesses functional groups capable of reacting with the vicinal epoxy or capable of reacting with the derivative of the oxirane formed by utilizing an agent capable of splitting open the ring so as to provide a hydroxyl group. The reagent typically possesses a functional group which is directly bound to carbon and, in most cases, the reagent predominates in carbon and hydrogen relative to the molar quantity of other elements making up the reagent.

The reagent is capable, depending upon the amount employed, of inter-reaction with the epoxy compounds of this invention to produce in specific instances, thermoplastic and thermosetting resins either in liquid or solid state.

Illustrative organic reagents include polycarboxylic acids, carboxylic acid anhydrides, polyols, polyesters containing chain terminating hydroxyl or carboxylic groups, primary amines, polyamino compounds wherein at least two nitrogen atoms thereof contain at least one bonded hydrogen atom each, polythiols, polyisocyanates, polyisothiocyanates, polyacylhalides, and similar compounds possessing functional groups suitable for reaction with the epoxy groups contained in the compounds of this invention. A mixture of these reagents may be employed in the practice of this invention. Moreover, the reagents may be employed in conjunction with the aforementioned catalysts.

The aforementioned catalysts and reagents are frequently termed organic hardeners in that they cause a degree of polymerization which may result in a solid product.

The reagent can be added to the epoxy compounds of this invention by simple mixing therewith, desirably with sufficient vigor so as to provide a homogeneous mixture. The order of addition of the reagent and the epoxy compound in the mixing procedure does not appear critical though it is often found desirable to first add the component, i.e., the reagent or the epoxy compound, that has the lower viscosity. This will ensure a more rapid mixing of the components. If either one or both of the components are solid, and mixing is effected in the absence of a solvent, heat may be applied to the solids in an amount sufficient to cause melting thereof and allow intermixture of the two components. The application of heat should not be prolonged to the extent that appreciable curing takes place during mixing.

Various polyfunctional compounds of the above classes may be effectively employed as an organic reagent in the practice of this invention and many of these are hereinafter illustrated. Illustrative of polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, muconic acid, alpha-dihydromuconic acid, beta-dihydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic or methacrylic acid and an olefinically unsaturated monomer such as butadiene, styrene, ethyl acrylate, vinyl halide, and the like, also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptyl-succinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4 - nitrophthalic anhydride, 1,2-naphthalic anhydride, 2,3-naphthalic anhydride, 1,8-naphthalic anhydride, tetrabromophthalic anhydride, tetraidophthalic anhydride, and the like. Polycarboxylic acid anhydrides which have melting points below about 250° C. are desirable.

Illustrative of usable polyols include, the aliphatic and cycloaliphatic polyhydric alcohols, e.g., ethylene glycol, diethylene glycol, tri-, tetra- and other polyethylene glycols, propylene glycol, di-, tri-, tetra- and other polpropylene glycols, the polyethylenepolypropylene glycols, trimethylene glycol, the various isomers of butanediol, 2-butene-1,4-diol, the various isomers of pentanediol, the various isomers of pentenediol, 2 - ethyl - 1,3 - hexanediol, the various isomers of hexenediol, 2 - methoxy - 2,4-dimethyl-1,5-pentanediol, 12,13-tetracosanediol, polygylcerol, 1,1,1-trimethylolpropane, pentaerythritol, sorbitol, the polyvinyl alcohols, the various isomers of octenediol, the various isomers of cyclopentanediols, the various isomers of cyclohexanediols, the various isomers of the lower alkyl (1 to 8 carbon atoms) substituted-cyclohexanediols, inositol, trimethylolbenzene, and the polyhydric phenols, e.g., resorcinol, catechol, pyrogallol, hydroquinone, the dihydroxytoluenes, dihydroxyxylene, bis(4-hydroxyphenyl) - 2,2 - propane, bis(4 - hydroxyphenyl) methane, 1,9-naphthalenediol, the polyhydric phenolformaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable.

The primary amines which may be employed as reagents herein include any organic compound bearing a single nitrogen atom directly bonded to carbon of the compound and contains two hydrogen atoms directly bonded to the nitrogen. Significantly desirable primary monoamines include those having the formula $R°NH_2$, wherein R ° is a radical such as alkyl, alkenyl, cycloalkyl cycloalkenyl, aryl, alkaryl and aralkyl. Illustrative primary amines include methylamine, ethylamine, n-propylamine, isopropylamine, n-butylamine, 2-ethylhexylamine, dodecylamine, octadecylamine, allylamine, 2 - butenylamine, 11-undecenylamine, cyclohexylamine, cyclopentylamine, cyclobutylamine, the cyclobutenyl, cyclopentenyl, cyclohexenyl, cycloheptenyl, and cyclooctenyl amines, phenylamine, the naphthylamines, the anthracylamines, the xylyl and tolylamines, benzylamine, and the like.

Illustrative polyamino compound include aliphatic, aromatic, and cycloaliphatic amines and amides containing at least two nitrogen atoms each of which possesses a bonded hydrogen atom as, e.g., is the case with hydrazines, such as hydrazines, sym-dimethyl hydrazines, unsym-sym-dimethyl hydrazine, sym-diphenyl hydrazine, unsymdiphenyl hydrazine; alkylene diamines such as ethylene diamine, N,N'-dimethyl ethylene diamine, N,N-diphenyl ethylene diamine, other alpha-omega alkylene diamines of from 3 to 12 carbon atoms such as the aforementioned primary and secondary ethylenediamines; polyalkylenepolyamines such as diethylenetriamine, 4-methyldiethylenetriamine, triethylenetetramine, 4,7 - dimethyltriethylenetetramine, and polyalkylenepolyimines from polymerization of ethylene imine; heterocycloaliphatic amines such as piperazine, 2 - methylpiperazine, 2.5 - dimethylpiperazine, 2,3,5,6-tetramethylpiperazine, and other lower alkyl (2 to 8 carbon atoms) substituted piperazines as above described; aromatic polyamines such as 1,4-phenylenediamine, 1,3-phenylenediamine, 4-aminobenzylamine, bis(1,4 - diaminomethyl)benzene, bis(1,4 - diaminopropyl)benzene, and bis(4-aminophenyl)amine; cycloaliphatic polyamines such as 1,4-diaminocyclohexane, 1,3-diaminocyclohexene, 1,2-diaminocyclohexane, 1,3-diaminocyclopentane, 1,3-diaminocyclobutane, and 1,4-diaminocycloheptane, and the like; amine substituted heterocyclics such as melamine and gamma-aminopropyl methyl siloxane cyclic tetramer; compounds containing amido groups having N-substituted hydrogen such as urea, biuret, semicarbazide, N,N'-dialkyl urea, guanidine, thiourea, adipamide, succinamide, sebacamide, polyamides such as polyhexamethylene adipamide, poly-ε-caprolactam (poly-ε-aminocaproic acid), polypyrrolidone, polyurethanes such as the reaction product of tolylene dissocyanate and ethylene glycol, and the like.

Illustrative polythiols include the aliphatic, cycloaliphatic and aromatic polythiols such as 1,2-dimercaptoethane, the remainder of the series of alkylene (2 to 12 carbon atoms) alpha, omega-dithiols, 1,4-dimercaptobenzene, 1,4-dimercaptocyclohexane, and the like.

Illustrative of polyisocyanates include the aliphatic, cycloaliphatic and aromatic polyisocyanates. The following illustrative list of polyisocyanates are also representative of polyisothiocyanates by substituting the oxygen of the isocyanato group with a sulphur atom. The polyisocyanates of this invention include alpha-omega alkalene (1 to 12 carbon atoms) diisocyanates, 1,4-phenylene diisocyanate, bis(4 - isocyanatophenyl)amine, toluene - 2,4-diisocyanate, toluene-2,6-diisocyanate, toluene-2,4,6-triisocyanate, 2,4,4'-tri-isocyanate diphenyl ether, bis (4-isocyanatophenyl)-2,2'-propane, bis(4-isocyanatophenyl) methane, and the like.

Polyacyl halides within the purview of this invention include the acyl halides (e.g., acyl chlorides and bromides) of the aforementioned polycarboxylic acids and anhydrides. Also, esters of the aforementioned polycarboxylic acids of their anhydrides may be employed. This includes polyesters formed from the reaction of a polyol and the aforementioned polycarboxylic acids, their anhydrides or acid halides. Illustrative of the polyesters are those from the reaction of phthalic acid and pentaerythritol modified or unmodified with fatty acids such as the acids of linseed oil, soybean oil, and cottonseed oil; polyesters such as those obtained from the condensation of terephthaloyl chloride and ethylene glycol; and other polyesters of the alkyd resin class such as the condensation product of maleic acid, glycerine and vegetable oils.

The above class of organic reagents possess functionality in the form of reactive groups capable of splitting open the oxirane ring of the epoxy compounds or compositions of this invention, whereby to effect reaction therewith and cause the production of a resinous composition of a molecular weight greater than that of the starting epoxy composition or compound. The functional group of the polycarboxylic acids, their anhydrides or acid halides, is the carbonyloxy

moiety. With respect to the polyols, the hydroxyl (—OH) group is the functional group. In the case of the polyesters, either the terminating carboxyl or hydroxyl groups represent its functionality. With respect to the amino compounds, the nitrogen having a bonded hydrogen represents the functional group. It is to be understood that if a nitrogen atom has two bonded hydrogen, the compound is at least difunctional. In the case of polythiols, the mercapto group is the functional group, and with polyisocyanates and polyisothiocyanates, the isocyanato or isothiocyanato moieties represent the functional groups.

The organic reagent may be employed in amounts so as to provide from about 0.001 to about 15.0, usually from about 0.01 to 5.0, functional groups thereof per vicinal epoxy group of said epoxy compounds and compositions of this invention. Desirably, a ratio of from about 0.1 to about 3.5 of the functional groups to the epoxy groups is employed. In preferred operation, this ratio is from 0.5 to 2.0. Oftentimes a 1 to 1 ratio of functional groups to epoxy group is found significantly desirable.

In many instances it is desirable to add the reagent to the epoxide composition in two steps. The first addition typically utilizes an amount of reagent whereby to provide a low ratio of functional groups per epoxide group, say from about 0.01 to about 0.8 so that the resulting condensation product has a viscosity indicating a low state of polymerization. This product is termed an intermediate stage resinous composition comparable to an A-stage resin. The ultimate molecular weight polymer obtainable from the reaction of a particular reagent and epoxide indicates whether an intermediate polymerized state is reached in any given instance.

Reaction between the reagent and the aforementioned epoxy compounds or compositions (i.e., the aforementioned addition polymers of the epoxy compounds) of this invention can be effected within a broad temperature range such as from about 20° C. to about 300° C. Higher and lower temperatures are also included. In most cases the reaction will be effected at between about 75° C. and 200° C.

The reaction may be effected in the presence or absence of a solvent. Of course, it is most desirable to effect the reaction at a temperature at which the components of the reaction are in liquid state. But if any of the components are not suitably usable in liquid state, it may be dissolved in a solvent therefor, and incorporated in the other component or components of the reaction. In most instances a solvent can be employed to effect a partially polymerized composition which can be hardened by evaporating the solvent. Of course, this is restricted by the nature of the product which is dissolved. If the product of reaction between the epoxy compounds of this invention and the organic reagent form a thermosetting resinous composition free of ethylenic unsaturation capable of oxidizing to a cured state at low temperatures (such as those provided in fatty acids such as linoleic acid), then additional heat typically above 50° C. is necessary to achieve not only solvent evaporation, but complete thermoset of the resinous composition. On the other hand, if the resinous composition comprises a thermoplastic reaction product, simple evaporation of the solvent at any convenient temperature will result in a solid thermoplastic mass.

In any event, use of solvent in the polymerization reaction is oftentimes desirable regardless of the fusability of the reaction product. The solvent should be inert to the reactants or reaction product, liquid at the temperature of use and compatible with at least one of the reactants, preferably compatible with all of the components of the reaction as well as the resulting reaction product. The most desirable solvents are organic and include such chemicals as xylene, toluene, mineral spirits, specific aliphatic hydrocarbons such as n-hexane, n-heptane, n-octane, 2-ethylhexane, methyl isobutyl ketone, methyl isopropyl ketone, ethyl acetate, butyl acetate, amyl acetate, and the like. It is preferred that the aforementioned esters not be used as a solvent during the reaction between the organic reagent and the epoxides. On the other hand, they are most desirably employed as a solvent for the product from the reaction of these two components.

Thermoplastic materials can be obtained by simple addition polymerization of the aforementioned epoxy compounds in the manner described above. Of course, the amount of functionality possessed by the components undergoing reaction is a critical factor. Thus, if the epoxy compound possesses only one ethylenically unsaturated moiety and is reacted with itself or another monoethylenically unsaturated compound, the resulting polymeric product will typically be thermoplastic. Of course, poly-olefinically unsaturated monomers may be incorporated in this reaction, but to obtain a thermoplastic product they should not be present in an amount in excess of 5 mol percent basis total mols present in the reaction.

Thermoplastic resins may also be obtained by reacting the aforementioned reagents or catalysts with mono-epoxides of the cyclopentenylcyclopentenyl compounds of this invention. In view of the monoepoxy functionality, a substantially linear polymer is obtainable upon reaction with the aforementioned reagents and catalysts, particularly when the reagent possesses not more than two functional groups.

Thermoset resinous compositions are obtainable by reaction of the di-, tri-, tetra- and other poly-epoxides with the aforementioned reagents and catalysts, or the monoepoxide with a reagent having at least two functional groups. If the resinous compositions obtainable from reaction with the catalyst or reagents possess residual olefinic unsaturation, further cross-linking of the composition can be effected by incorporating the aforementioned free-radical initiators and heating the composition to a final cure.

These products, as well as the thermoplastic materials, may be utilized as surface coatings by the dissolution thereof in solvents and applying the solution to a solid surface. Upon the evaporation of the solvent a hard coating is obtained. The resinous materials may also be used for the manufacture of molded products by extrusion or casting molding techniques. This can be accomplished from a solvent solution or from an intermediate resinous state which is heated to effect a final cure.

The resinous products of this invention may be admixed with a plurality of filler and/or pigmentary materials as, e.g., siliceous pigments such as hydrated silica, aerogels, xerogels, or fumed silica; titanium dioxide pigment; aluminum pigment; pigmentary or filler clays, and the like.

The resinous compositions may also be blended with other resins whereby to modify the characteristics of the products of this invention. Thus, the resins of this invention may be intermixed with nitrocellulose lacquers, vinyl chloride polymers, vinyl acetate polymers, vinyl alcohol polymers, polyacrylates such as polyethylacrylate, polyacrylamides such as copolymers of acrylamide and butylacrylate reacted with formaldehyde, and the like.

The following examples serve to illustrate specific embodiments of this invention which are not intended to limit the scope of this invention.

*Example I*

135 grams (0.478 mole) of bis(bicyclopentenyl)ether

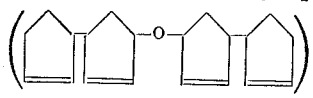

is added to 294 grams of a 24.7 percent peracetic acid in ethyl acetate solution (0.956 mole of peracetic acid). The reaction is carried out by adding the ether dropwise over 1.5 hours to the peracetic acid solution, the temperature being maintained at 10° C. through external cooling with ice. The reaction mixture is maintained at 10° C. for an additional two hours and then at room temperature for two hours. At this point analysis of the peracetic acid present shows the reaction to be 95 percent complete.

The product is isolated by adding the reaction mixture dropwise to 600 grams of ethylbenzene refluxing at 25 mm. The ethyl acetate, acetic acid, peracetic acid and ethylbenzene are withdrawn overhead. There is obtained a residue product weighing 152 grams. Analysis for epoxide shows the product to be 88.2 percent pure, calculated as a diepoxide. The product has an equivalent weight of 168, as determined by the Wijs method. Theoretical is 158. After 3 hours under high vacuum on the rotary evaporator the analysis shows the product to be 90 percent diepoxide of the bis(bicyclopentenyl)ether.

*Example II*

One hundred and thirty-five grams of bis(bicyclopentenyl)ether (0.478 mole) as employed in Example I is added over a period of two hours to 735 grams of 24.7 percent peracetic acid in ethyl acetate solution, (2.39 moles of peracetic acid). The temperature is maintained at 25° C. with an ice bath. The reaction mixture is maintained at room temperature for an additional four hours and then stored overnight at —6° C. After a heating period of four hours at 55° C., analysis shows the reaction to be 96 percent complete. The product is isolated by the procedure described in Example I to give 172 grams of product. Analysis of the product shows it to be 76.2 percent tetraepoxide of bis(bicyclopentenyl)ether.

Example III

Epoxidation of 131 grams (0.875 mole) of cyclopentenylcyclopentenol.

with 2.19 moles of peracetic acid in ethyl acetate solution is effected according to the procedure of Example I. The temperature is maintained at 25° C. for seven hours, at —6° C. over a weekend and finally at 30° C. for two hours. After washing there is obtained 171 grams of residue product. Distillation yielded 87 grams of product boiling from 138° C./10.9 millimeters mercury to 139° C./0.6 millimeter mercury. Epoxide analysis shows the product to be 92.1 percent pure.

Calcd. $C_{10}H_{14}O_3$: C, 65.91; H, 7.74. Found: C, 65.80; H, 7.87.

The product is

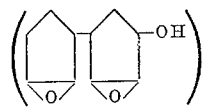

Example IV

Thirty-three grams (0.172 mole) of cyclopentenylcyclopentenyl acetate

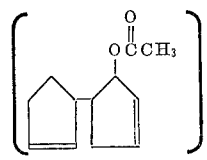

is fed in small portions to 105.5 grams of a 24.75 percent peracetic acid in ethyl acetate solution (0.344 mole of peracetic acid). The reaction mixture is held at room temperature (25° C.) for six days. At the end of this time 88.4 percent of the peracetic acid has been consumed. The reaction mixture is treated according to Example I to isolate 36 grams of residue product. The residue is distilled yielding 23 grams of distilled material. A wide cut of B.P. 133° C./0.6 millimeter Hg analysis 84 percent epoxide.

*Analysis.*—Calculated for $C_{12}H_{16}O_4$: C, 64.27; H, 7.19. Found: C, 63.62; H, 7.04.

A yield of 60 percent of the diepoxide is obtained upon distillation.

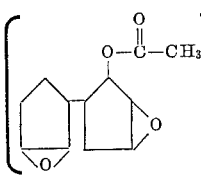

Example V

Epoxidation of 264 grams (1.61 moles) of cyclopentylcyclopentenyl methyl ether

is performed as described in Example I, using 4.04 moles of peracetic acid in solution. The temperature of the reaction mixture is maintained at 25° C. for seven hours then at —6° C. overnight. A three-hour heating period at 35° C. the next day finds the reaction to be 92.4 percent complete. Azeotropic distillation gives 335 grams of residue product. Distillation of 257 grams of the residue product yields 84 grams of diepoxide of the formula

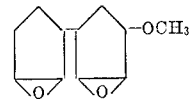

analyzing 85 percent as a diepoxide. Analysis calculated for $C_{11}H_{16}O_3$: C, 67.32; H, 8.22. Found: C, 66.98; H, 8.19. This represents a yield of 35 percent of distilled product. There is also obtained about 92 grams of isolatable monoxide of the formula

and

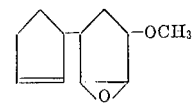

Example VI

To 90 grams (0.415 mole) of cyclopentenyl bicyclopentenyl ether of the formula

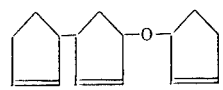

is added to 257 grams of a 27.2 percent solution of peracetic acid (0.92 mole) in ethyl acetate over a one-hour period at 40° C. After a reaction period of 2.5 hours an analysis for peracetic acid indicates that two equivalents of peracetic acid is consumed. The reaction mixture is added dropwise to a still kettle containing 500 grams of ethylbenzene under reflux at such a pressure as to keep the kettle temperature at approximately 50° C. Ethyl acetate, acetic acid and excess peracetic acid are removed continuously along with ethylbenzene. An additional 150 milliliters of ethylbenzene is added and the kettle is then stripped to a temperature of 70° C. at 1 millimeter Hg pressure. The residue product (104 grams) is then flash-distilled on a one-plate column (B.P. 145–170° C. at 1 millimeter Hg) to obtain 73 grams of distillate and 13 grams of residue.

The distillate from the above distillation is combined with that obtained from another similar run and the combined material is fractionated on a small Vigreux column. A cut is obtained which analysis determines to be the diepoxide of cyclopentenyl bicyclopentenyl ether.

Infrared spectrum, contains a band at $6.15\mu$ characteristic of a double bond and a very strong absorption in the $11.7–11.9\mu$ region characteristic of the epoxide groups.

*Analysis.*—Calculated for $C_{15}H_{20}O_3$: C, 72.55; H, 8.12. Found: C, 72.39; H, 8.01.

Example VII

To 144 grams (0.666 mole) of cyclopentenyl bicyclopentenyl ether

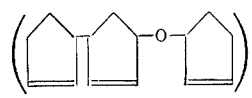

is stirred in 820 grams of a 22.3 percent solution of peracetic acid (2.4 moles) in ethyl acetate over a period of 40 minutes while maintaining a temperature of 40° C. The reaction is continued at 40° C. until a total of 1.957 moles of peracetic acid has been consumed (98 percent of the theoretical). The reaction mixture is diluted with 500 ml. of carbon tetrachloride and washed twice with water and once with dilute sodium carbonate solution.

After removal of carbon tetrachloride by distillation under reduced pressure there is obtained 156 grams of residue product which still contains approximately 3 percent acetic acid. It is redissolved in toluene and washed again with sodium carbonate and water. After evaporation of toluene under reduced pressure there is obtained 139 grams of light-colored slightly viscous residue product which analyzes 81.4 percent pure by the pyridine hydrochloride method of analysis for epoxide. Analysis determines the epoxide product to have the formula:

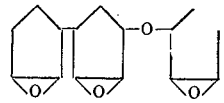

*Example VIII*

Employing the procedures of Example I the following cyclopentenyl compounds are epoxidized with peracetic acid to the indicated epoxides:

| | Cyclopentenyl Compound | | Epoxide Product |
|---|---|---|---|
| (a) | —OC(=O)NHCH₃ | (a) | —OC(=O)NHCH₃ (diepoxide) |
| (b) | OCH₂CH=CH₂ | (b) | OCH₂CH=CH₂ (monoepoxide) |
| (c) | —OCH₂CH=CH₂ | (c) | —OCH₂CH—CH₂ (with epoxide on side chain) |
| (d) | CH₃, CH₃, CH₃ tris-cyclopentenyl ether | (d) | CH₃, CH₃, CH₃ tris-epoxide |
| (e) | —OCH₂CH₂OH | (e) | —OCH₂CH₂OH (diepoxide) |
| (f) | C₂H₅, C₂H₅, —OC(=O)CH₃ | (f) | C₂H₅, C₂H₅, —OC(=O)CH₃ (diepoxide) |
| (g) | O—C(=O)—CH=CH₂ | (g) | O—C(=O)—CH=CH₂ (monoepoxide) |
| (h) | —S—CH=CH₂ | (h) | —SO₂—CH=CH₂ (diepoxide) |
| (i) | CH₂—CH₂—CH₃, CH₂—CH₂—CH₃, —N(CH₂CH₃)₂ | (i) | CH₂—CH₂—CH₃, CH₂—CH₂—CH₃, —N(→O)(CH₂CH₃)₂ (diepoxide) |
| (j) | —CN | (j) | —CN (diepoxide) |
| (k) | —S—C₆H₅ | (k) | —S(=O)₂—C₆H₅ (diepoxide) |

Example IX

A mixture is formed of epoxycyclopentyl epoxycyclopentyl cyclopentenyl ether, i.e.,

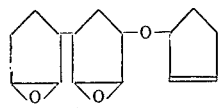

and the organic reagents and catalysts, as listed in Table I below. The resulting mixture is cured by heating at the temperature and for the period of time listed in Table I. The character of the resin obtained in each case is recited in Table I.

Example X 0.9 gram of the diepoxide of Example III and the reagents and catalysts in the amounts recited in Table II are mixed in a test tube at the indicated temperatures until a homogeneous mixture is obtained. The mixtures are heated at 120° C. for determining length of time ("gel time") until gel formation.

Example XI

The procedure of Example X is repeated except that the epoxide employed is 1.2 grams of that produced in Example V. Gel times are not recorded in this experiment. The pertinent data is recited in Table III.

Example XII

The procedure of Example X is repeated except that the epoxide employed is 0.65 gram of that produced in Example V. The pertinent data is recited in Table IV.

Example XIII

The procedure of Example XI is repeated except that the epoxide employed is 0.9 gram of that produced in Example I. The pertinent data of this example is recited in Table V.

TABLE I

| Amount of Epoxide | Organic Reagent | Grams of Organic Reagent | Catalyst | Grams of Catalyst | Functionality Ratio [1] | Mixing Temperature, °C. | Cure in Hrs. at °C. | Description of Resin |
|---|---|---|---|---|---|---|---|---|
| a. 1.2 grams | Diethylenetriamine. | 0.2 | | | 1.0 | 25 | 10 hours at 160° C. | Hard, brittle resin having Barcol hardness value of 40.[2] |
| b. 1.2 grams | p,p'-Methylenedianiline. | 0.5 | | | 1.0 | 25-80 | ....do.... | Hard, brittle resin. |
| c. 1.2 grams | Adipic acid | 0.44 | | | 0.6 | 25-100 | ....do.... | Do. |
| d. 1.2 grams | Phthalic anhydride. | 0.75 | | | 1.0 | 25-100 | ....do.... | Do. |
| e. 1.2 grams | | | BF₃-monoethylamine complex. | 0.12 | | 25-80 | ....do.... | Hard, brittle resin having Barcol hardness value of 35.[2] |

See footnotes at end of Table VII.

TABLE II

| Organic Reagent | Weight in Grams of Reagent | Catalyst | Amount of Catalyst | Mixing Temperature, °C. | Functionality Ratio [1] | Observed Gel Time (Hours) | Cure in Hrs. at °C. | Description of Resin |
|---|---|---|---|---|---|---|---|---|
| 1. Diethylenetriamine | 0.22 | | | 25 | 1.0 | 0.5 | 7 hours at 120° C.; 6 hours at 160° C. | Hard; Barcol hardness value of 70.[2] |
| 2. p,p'-Methylenedianiline | 0.50 | | | 25-80 | 1.0 | 2.5 | ....do.... | Hard; Barcol hardness value of 60.[2] |
| 3. Adipic Acid | 0.44 | | | 25-100 | 0.6 | 2.5 | ....do.... | Hard; Barcol hardness value of 50.[2] |
| 4. Phthalic Anhydride | 0.74 | | | 25-100 | 1.0 | 1.25 | ....do.... | Hard; Barcol hardness value of 65.[2] |
| 5. | | BF₃-monoethylamine. | 0.9 | 25-80 | | 3.75 | ....do.... | Hard; Barcol hardness value of 60.[2] |
| 6. | | KOH (15%) in ethylene glycol. | 0.056 | 25 | | 0.5 | ....do.... | Brittle. |

See footnotes at end of Table VII.

TABLE III

| Organic Reagent | Weight of Organic Reagent (Grams) | Functionality Ratio [1] | Catalyst | Weight of Catalyst (Grams) | Mixing Temperature, °C. | Cure in Hrs. at °C. | Description of Resin |
|---|---|---|---|---|---|---|---|
| a. Diethylenetriamine | 0.22 | 1.0 | | | 25 | 15 hours at 120° C., 6 hours at 160° C. | Brittle; Barcol hardness value of 50.[2] |
| b. p,p'-Methylenedianiline | 0.50 | 1.0 | | | 25-80 | ....do.... | Brittle. |
| c. Adipic Acid | 0.44 | 0.6 | | | 25-100 | ....do.... | Do. |
| d. Phthalic Anhydride | 0.74 | 1.0 | | | 25-100 | ....do.... | Slightly brittle; Barcol hardness value of 57.[2] |
| e. | | | BF₃-monoethylamine. | 0.12 | 25-80 | 7 hours at 120° C., 6 hours at 160° C. | Brittle; Barcol hardness value of 40.[2] |
| f. | | | KOH (15%) in ethylene glycol.[3] | 0.056 | 25 | 15 hours at 120° C., 6 hours at 160° C. | Very highly viscous. |

See footnotes at end of Table VII.

TABLE IV

| Organic Reagent | Weight of Reagent in Grams | Functionality Ratio [1] | Catalyst | Weight in Grams of Catalyst | Mixing Temperature, °C. | Observed Gel Time in Hours at 120° C. | Cure in Hrs. at ° C. | Description of Resin |
|---|---|---|---|---|---|---|---|---|
| 1. Diethylenetriamine | 0.11 | 1.0 | --- | --- | 25 | No Gel observed. | 15 hours at 120° C.; 6 hours at 160° C. | Brittle. |
| 2. p,p'-Methylenedianiline | 0.25 | 1.0 | --- | --- | 25–80 | ----do------ | ----do----- | Do. |
| 3. Adipic Acid | 0.22 | 0.6 | --- | --- | 25–100 | ----do------ | ----do----- | Do. |
| 4. Phthalic Anhydride | 0.37 | 1.0 | --- | --- | 25–100 | 11.5 hours at 120° C. | ----do----- | Hard; Barcol hardness value of 63.[2] |
| 5. | --- | --- | BF$_3$-monoethylamine. | 0.06 | 25–80 | 0.33 hours at 120° C. | 7 hours at 120° C.; 6 hours at 160° C. | Brittle. |
| 6. | --- | --- | KOH (15%) in ethylene glycol.[3] | 0.028 | 25 | No Gel observed. | 15 hours at 120° C.; 6 hours at 160° C. | Do. |

See footnotes at end of Table VII.

TABLE V

| Organic Reagent | Amount of Reagent (Grams) | Functionality Ratio [1] | Catalyst | Amount of Catalyst (Grams) | Mixing Temperature, °C. | Cure in Hrs. at ° C. | Description of Resin |
|---|---|---|---|---|---|---|---|
| a. Diethylenetriamine | 0.11 | 1.0 | --- | --- | 25 | 0.6 at 120; 12 at 160. | Hard. |
| b. | --- | --- | BF$_3$-monoethylamine. | 0.05 | 25–80 | ----do------ | Hard; Barcol hardness value of 35.[2] |
| c. Phthalic Anhydride | 0.37 | 1.0 | --- | --- | 25–100 | 1.5 at 120; 8 at 160. | Hard; Barcol hardness value at 40.[2] |
| d. Bisphenol A [bis(4-hydroxyphenyl)2,2'-propane]. | 0.32 | 0.5 | KOH (15%) in ethylene glycol.[3] | 0.01 | 25–100 | 13 at 160 | Hard. |
| e. 1,2,6-hexanetriol | 0.17 | 0.75 | BF$_3$-monoethylamine. | 0.05 | 25 | ----do------ | Do. |
| f. Adipic Acid | 0.18 | 0.5 | --- | --- | 25–100 | 5 at 120; 8 at 160. | Do. |

See footnotes at end of Table VII.

TABLE VI

| Organic Reagent | Amount of Reagent (Grams) | Functionality Ratio [1] | Catalyst | Amount of Catalyst (Grams) | Mixing Temperature, °C. | Cure in Hrs. at ° C. | Description of Resin |
|---|---|---|---|---|---|---|---|
| a. p,p'-Methylenedianiline | 0.5 | 1.0 | --- | --- | 25–80 | 5 at 120; 6 at 160. | Tough; Barcol hardness value of 45.[2] |
| b. Diethylenetriamine | 0.22 | 1.0 | --- | --- | 25 | ----do------ | Tough; Barcol hardness value of 55.[2] |
| c. Phthalic Anhydride | 0.93 | 1.25 | --- | --- | 25–100 | ----do------ | Tough; Barcol hardness value of 40.[2] |
| d. Maleic Anhydride | 0.49 | 1.0 | --- | --- | 25–50 | ----do------ | Do.[2] |
| e. Adipic Acid | 0.55 | 0.75 | --- | --- | 25–100 | ----do------ | Do.[2] |
| f. 1,2,6-hexanetriol | 0.22 | 0.5 | --- | --- | 25 | ----do------ | Tough; Barcol hardness value of 51.[2] |
| g. Bis (4-hydroxyphenyl)-2,2'-propane | 0.96 | 0.75 | KOH(15%) in ethylene glycol.[3] | 0.06 | 25–100 | ----do------ | Hard, Brittle. |
| h. | --- | --- | BF$_3$-monoethylamine. | 0.05 | 25–80 | ----do------ | Tough, Barcol hardness value of 51.[2] |

See footnotes at end of Table VII.

TABLE VII

| Organic Reagent | Amount of Reagent (Grams) | Functionality Ratio [1] | Catalyst | Amount of Catalyst (Grams) | Mixing Temperature, °C. | Cure in Hrs. at ° C. | Description of Resin |
|---|---|---|---|---|---|---|---|
| 1. Diethylenetriamine | 0.22 | 1.0 | --- | --- | 25 | 3 at 120; 10 at 160. | Tough; Barcol hardness value of 55.[2] |
| 2. | --- | --- | BF$_3$-monoethylamine. | 0.06 | 25–80 | 1.75 at 120; 6.5 at 160. | Tough; Barcol hardness value of 65.[2] |
| 3. | --- | --- | 5 percent by weight aqueous H$_2$SO$_4$. | 0.02 | 25 | 3 at 120; 10 at 160. | Tough; Barcol hardness value of 65.[2] |
| 4. | --- | --- | KOH (15%) in ethylene glycol.[3] | 0.14 | 25 | ----do------ | Brittle; Barcol hardness value of 45.[2] |
| 5. Phthalic Anhydride | 0.7 | 1.0 | --- | --- | 25–100 | ----do------ | Tough; Barcol hardness value of 65.[2] |
| 6. Bis(4-hydroxyphenyl)-2,2'-propane | 0.7 | 0.5 | KOH (17%) in ethylene glycol. | 0.03 | 25–100 | 2 at 120; 9 at 160. | Tough; Barcol hardness value of 36.[2] |
| 7. 1,2,6-hexanetriol | 0.34 | 0.75 | BF$_3$-monoethylamine. | 0.05 | 25 | 1.5 at 120; 6 at 160. | Tough; Barcol hardness value of 60.[2] |
| 8. Adipic Acid | 0.37 | 0.5 | --- | --- | 25–100 | 0.2 at 120; 8 at 160. | Tough; Barcol hardness value of 3.[2] |

[1] The number ratio of the functional groups (or functionality) of the organic reagent to the epoxy groups of the epoxide.
[2] Obtained from Barcol Impressor GYZJ-934-1 at 25° C.
[3] KOH in ethylene glycol, basis total weight of solution.

Example XIV

The procedure of Example X is repeated except that the epoxide employed is 1.1 grams of that produced in Example VII. The pertinent data is recited in Table VI.

Example XV

The procedure of Example X is repeated except that the epoxide employed is 1.1 grams of that produced in Example II. The pertinent data is recited in Table VII.

Example XVI

To a cold Pyrex tube is charged 5.0 grams of allyl epoxycycloptentylepoxycyclopentyl ether

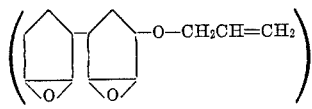

15.0 grams of vinyl chloride, 10.0 grams of acetone and 1.0 ml. of a 25 weight percent solution of acetyl peroxide in dimethyl phthalate. The tube is purged with nitrogen, sealed, and rocked in a water bath at 50° C. for 10.7 hours. The recovered copolymer weighs 3.5 grams and analyzes 83.4 weight percent of vinyl chloride.

Example XVII

A mixture of 10 grams of ethyl arcylate, 10 grams of epoxycyclopentylepoxycyclopentyl methacrylate

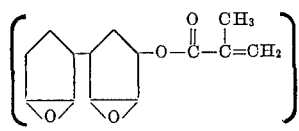

and 1 gram of a 25 percent solution of diacetyl peroxide in dimethyl phthalate is warmed to 50° C. and held there until the reaction mixture is solid. The solid resin is then dissolved in 100 grams of butyl acetate and the resin is precipitated by slowly pouring the resin solution into 800 ml. of methanol which is being stirred rapidly. Upon filtering and drying there is obtained 16 grams of a white solid copolymer. A film cast from a 10 percent solution of the copolymer containing 0.2 percent phosphoric acid (based on copolymer) is baked at 150° C. to a clear insoluble tough film.

Though the invention herein has been specifically described, it is not intended that it be construed as being commensurately limited unless indicated by the claims.

What is claimed is:

1. An epoxide compound containing a plurality of joined radicals from the group consisting of cyclopentyl and cyclopentenyl, at least one of said radicals is cyclopentyl possessing an oxirane group as part thereof.

2. An organic epoxy compound containing at least two joined radicals from the group consisting of cyclopentyl and cyclopentenyl, at least two of said radicals directly bonded at one carbon atom of each of said radicals, and at least one of said radicals is cyclopentyl possessing an oxirane group as part thereof.

3. An epoxide compound of the formula:

A—B wherein A is a radical from the class consisting of

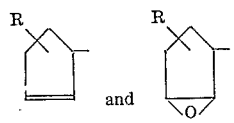

B is a radical from the class consisting of

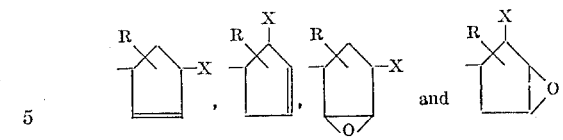

each R is a member of the group consisting of hydrogen and alkyl of from 1 to 12 carbon atoms; X is a radical from the class consisting of

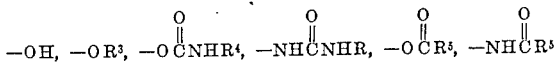

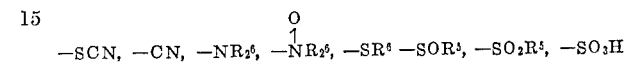

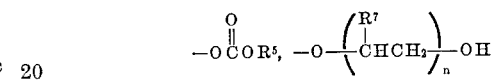

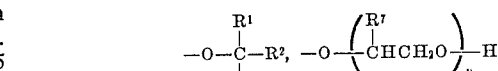

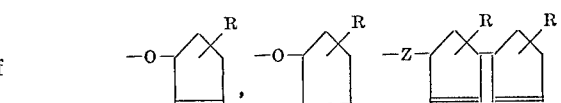

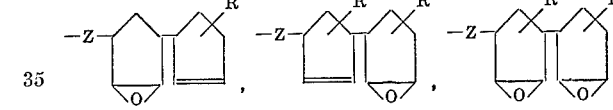

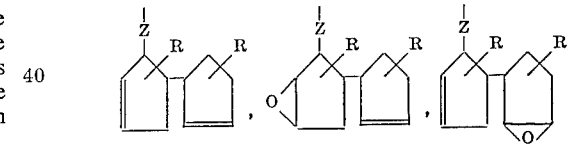

and

wherein Z is from the class consisting of oxygen, sulfur, sulfoxide and sulfone; $R^1$ is a member from the group consisting of alkenyl radicals of from 2 to 12 carbon atoms and vicinal epoxyalkyl of from 2 to 12 carbon atoms; $R^2$ is from the group consisting of hydrogen, alkyl of from 1 to 12 carbon atoms, alkenyl of from 2 to 12 carbon atoms and vicinal epoxyalkyl of from 2 to 12 carbon atoms; $R^3$ is from the group consisting of aryl and alkaryl; $R^4$ is an alkyl group of from 1 to 12 carbon atoms; $R^5$ is a radical from the class consisting of alkyl of from 1 to 12 carbon atoms, alkenyl of from 2 to 12 carbon atoms, vicinal epoxyalkyl of from 2 to 12 carbon atoms, aryl and alkaryl; $R^6$ is from the class consisting of $R^5$ and hydrogen; $R^7$ is from the class consisting of hydrogen and methyl; and $n$ is an integer of from 1 to 6; said epoxide compound containing at least one vicinal epoxy group therein.

4. The epoxy compound of claim 1 having at least 2 vicinal epoxy groups therein.

5. An epoxy compound having the formula:

wherein L is from the group consisting of

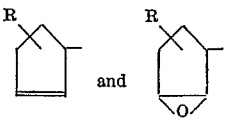

M is a radical selected from the group consisting of

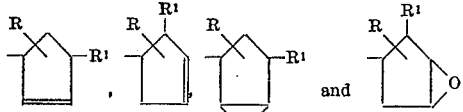

wherein $R^1$ is from the class consisting of

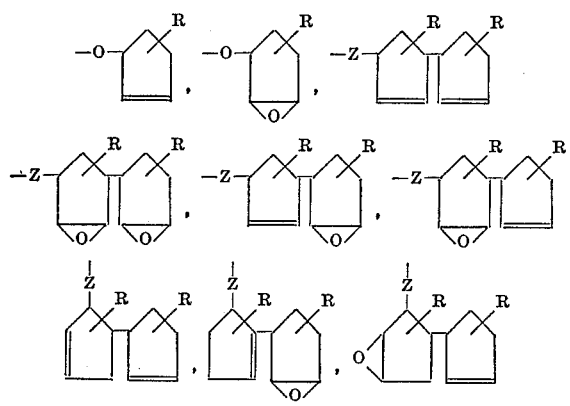

and

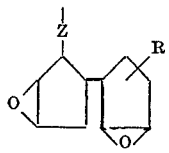

$R^1$ contains a

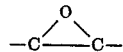

at least when L and M, exclusive of $R^1$, are free of a vicinal epoxy group; R is a radical from the class consisting of hydrogen and alkyl of from 1 to 12 carbon atoms; and Z is from the class consisting of oxygen, sulfur, sulfoxide and sulfone.

6. An additional polymer of at least one epoxide compound of claim 3 possessing olefinic unsaturation.

7. An addition polymer of at least one epoxide compound of claim 3 possessing olefinic unsaturation and another olefinically unsaturated compound.

8. A resinous composition comprising a polymeric composition of an epoxide compound of claim 3 and a catalyst from the group consisting of acidic and basic compounds capable of opening a vicinal epoxy radical of said compound at the site of a carbon to oxygen bond.

9. A resinous composition comprising a polymeric composition of an epoxide compound of claim 3 and an organic reagent possessing a functional group capable of adding to the compound at the site created by splitting an oxygen to carbon bond of an epoxy group of said compound.

10. The composition of claim 3 wherein the catalyst is a Lewis acid.

11. The composition of claim 9 wherein the organic reagent is a member of the class consisting of organic polycarboxylic acids, organic polycarboxylic acid anhydrides, organic polyols, polyesters chain terminated by at least one from the group consisting of hydroxyl and carboxylic, primary amines, polyamino organic compounds wherein at least two nitrogen atoms thereof contain at least one bonded hydrogen atom each, organic polythiols, organic polyisocyanates, organic polyisothiocyanates, and organic polyacyl halides.

References Cited

UNITED STATES PATENTS

| | | | |
|---|---|---|---|
| 3,004,961 | 10/1961 | Hauptschein | 260—2 |
| 2,916,462 | 12/1959 | Korach | 260—2 |
| 3,072,706 | 1/1963 | Fitzpatrick et al. | 260—243 |

OTHER REFERENCES

Chemical Abstracts, vol. 49, October 1955, G–120 Library (col. 14256f; 16318h relied on).

Chemical Reviews, vol. 45, August 1949, Swern Copy 260–2Ep (pp. 16–25).

WILLIAM H. SHORT, *Primary Examiner.*

SAMUEL H. BLECH, *Examiner.*

T. E. PERTILLA, *Assistant Examiner.*